US012193500B2

(12) United States Patent
Ki et al.

(10) Patent No.: US 12,193,500 B2
(45) Date of Patent: Jan. 14, 2025

(54) AEROSOL GENERATING SYSTEM INCLUDING MULTIPLE SUBSTRATE SECTIONS CORRESPONDING TO DIFFERENT HEATER SURFACE AREAS

(71) Applicant: KT&G CORPORATION, Daejeon (KR)

(72) Inventors: Sung Jong Ki, Daejeon (KR); Young Joong Kim, Daejeon (KR); In Su Park, Seoul (KR); John Tae Lee, Daejeon (KR); Sun Hwan Jung, Daejeon (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 772 days.

(21) Appl. No.: 15/734,334

(22) PCT Filed: Jul. 15, 2020

(86) PCT No.: PCT/KR2020/009305
§ 371 (c)(1),
(2) Date: Dec. 2, 2020

(87) PCT Pub. No.: WO2021/025319
PCT Pub. Date: Feb. 11, 2021

(65) Prior Publication Data

US 2021/0368865 A1 Dec. 2, 2021

(30) Foreign Application Priority Data

Aug. 8, 2019 (KR) ........................ 10-2019-0096911

(51) Int. Cl.
*A24F 40/46* (2020.01)
*A24B 15/16* (2020.01)
(Continued)

(52) U.S. Cl.
CPC .............. *A24F 40/46* (2020.01); *A24B 15/16* (2013.01); *A24D 1/02* (2013.01); *A24D 1/20* (2020.01);
(Continued)

(58) Field of Classification Search
CPC .......... A24F 40/46; A24F 40/20; A24F 40/30; A24F 40/40; A24F 40/57; A24F 40/50;
(Continued)

(56) References Cited

U.S. PATENT DOCUMENTS 10,362,809 B2 6/2019 Worm et al.
11,044,947 B2 6/2021 Wu et al.
(Continued)

FOREIGN PATENT DOCUMENTS

CA 3080145 A1 * 10/2018 ............. A24B 15/16
CN 207444281 U 6/2018
(Continued)

OTHER PUBLICATIONS

International Search Report of PCT/KR2020/009305 dated Oct. 23, 2020 [PCT/ISA/210].
(Continued)

*Primary Examiner* — Justin M Kratt
(74) *Attorney, Agent, or Firm* — Sughrue Mion, PLLC

(57) ABSTRACT

Disclosed is an aerosol generating system including a cigarette and an aerosol generating device. The cigarette includes a first substrate section and a second substrate section which include a non-tobacco material sheet containing an aerosol generating material, and the aerosol generating device includes a single heater disposed so that a heating area of the first substrate section is different from a heating area of the second substrate section.

10 Claims, 7 Drawing Sheets

(51) Int. Cl.

| | |
|---|---|
| ***A24D 1/02*** | (2006.01) |
| ***A24D 1/20*** | (2020.01) |
| ***A24F 40/20*** | (2020.01) |
| ***A24F 40/30*** | (2020.01) |
| ***A24F 40/40*** | (2020.01) |
| ***A24F 40/57*** | (2020.01) |
| ***H05B 1/02*** | (2006.01) |
| ***H05B 3/42*** | (2006.01) |
| *A24B 15/12* | (2006.01) |
| *A24F 40/50* | (2020.01) |
| *H05B 3/04* | (2006.01) |
| *H05B 3/40* | (2006.01) |

(52) U.S. Cl.

CPC .............. *A24F 40/20* (2020.01); *A24F 40/30* (2020.01); *A24F 40/40* (2020.01); *A24F 40/57* (2020.01); *H05B 1/0227* (2013.01); *H05B 1/0244* (2013.01); *H05B 3/42* (2013.01); *A24B 15/12* (2013.01); *A24F 40/50* (2020.01); *H05B 3/04* (2013.01); *H05B 3/40* (2013.01); *H05B 2203/021* (2013.01); *H05B 2203/022* (2013.01)

(58) Field of Classification Search

CPC .......... A24B 15/16; A24B 15/12; A24D 1/02; A24D 1/20; H05B 1/0227; H05B 1/0244; H05B 3/42; H05B 3/04; H05B 3/40; H05B 2203/021; H05B 2203/022

See application file for complete search history.

(56) References Cited

U.S. PATENT DOCUMENTS

| | | | | |
|---|---|---|---|---|
| 2011/0126848 | A1* | 6/2011 | Zuber | A24F 40/46 131/329 |
| 2014/0261490 | A1 | 9/2014 | Kane | |
| 2016/0295926 | A1 | 10/2016 | Zuber | |
| 2018/0007973 | A1 | 1/2018 | Thorens | |
| 2018/0235278 | A1* | 8/2018 | Mahler | A24F 40/40 |
| 2019/0045844 | A1 | 2/2019 | Reevell | |
| 2019/0142064 | A1 | 5/2019 | Pijnenburg et al. | |
| 2019/0208820 | A1 | 7/2019 | Reevell | |
| 2020/0046028 | A1 | 2/2020 | Oh et al. | |
| 2021/0127748 | A1 | 5/2021 | Lim et al. | |

FOREIGN PATENT DOCUMENTS

| | | | |
|---|---|---|---|
| CN | 109152425 | A | 1/2019 |
| EP | 2 327 318 | A1 | 6/2011 |
| JP | 2013-511962 | A | 4/2013 |
| JP | 2017-077181 | A | 4/2017 |
| KR | 10-1635340 | B1 | 6/2016 |
| KR | 10-2016-0092988 | A | 8/2016 |
| KR | 10-2018-0070509 | A | 6/2018 |
| KR | 10-2019-0013716 | A | 2/2019 |
| KR | 10-2019-0038183 | A | 4/2019 |
| WO | 2015/122426 | A1 | 8/2015 |
| WO | 2018/194291 | A2 | 10/2018 |
| WO | 2019/071567 | A1 | 4/2019 |

OTHER PUBLICATIONS

Written Opinion of PCT/KR2020/009305 dated Oct. 23, 2020 [PCT/ISA/237].

Communication dated Mar. 29, 2023, issued in Chinese Application No. 202080003168.1.

Extended European Search Report issued Sep. 24, 2021 in European Application No. 20811228.4.

Office Action issued Dec. 7, 2021 in Japanese Application No. 2020-567079.

Communication dated Apr. 12, 2021 form the Korean Intellectual Property Office in Application No. 10-2019-0096911.

* cited by examiner

AEROSOL GENERATING SYSTEM INCLUDING MULTIPLE SUBSTRATE SECTIONS CORRESPONDING TO DIFFERENT HEATER SURFACE AREAS

CROSS REFERENCE TO RELATED APPLICATIONS

This application is a National Stage of International Application No. PCT/KR2020/009305, filed on Jul. 15, 2020, claiming priority to Korean Patent Application No. 10-2019-0096911, filed on Aug. 8, 2019

TECHNICAL FIELD

The present disclosure relates to an aerosol generating system.

BACKGROUND ART

Recently, the demand for alternatives to traditional combustive cigarettes has increased. For example, there is growing demand for a device for generating aerosol by heating an aerosol generating material in cigarettes, rather than by combusting cigarettes.

General aerosol generating systems include a cigarette containing a tobacco material and an aerosol generating material, and an aerosol generating device that heats the inside or the outside of the cigarette to a high temperature by using a heater. The aerosol generating system uses a tobacco material, such as a tobacco leaf, reconstituted tobacco, and so on, which contains nicotine, and thus, there is an advantage of improving nicotine migration and taste of tobacco during smoking, but the heating of a tobacco material to a high temperature often cause the cigarette to taste burnt or hot.

In addition, a liquid aerosol generating system including a cartridge containing a nicotine and an aerosol generating material together with a flavor component has an advantage of generating abundant aerosol. However, leakages may occur and it is difficult to provide a user with warm aerosol. Accordingly, there may be a need for an aerosol generating system that improves the disadvantages of the aerosol generating systems of the related art.

DISCLOSURE

Technical Solution

Various embodiments provide an aerosol generating system in which a single heater is positioned to heat differently a portion of a cigarette that contains nicotine and another portion of a cigarette that contains a non-tobacco material sheet containing an aerosol generating material without nicotine. The technical problems to be solved by the present disclosure are not limited to the technical problems described above, and other technical problems may be inferred from the following embodiments.

Advantageous Effects

A cigarette of an aerosol generating system according to the embodiments may include a first substrate section and a second substrate section which include a non-tobacco material sheet coated with aerosol generating material on one or both sides. As such, a tobacco material is not directly used in generating aerosol, and thus, it is possible to prevent negative tobacco taste that appears as the tobacco material is heated to a high temperature. In addition, an aerosol generating material is provided in a form of being absorbed or applied to a non-tobacco material sheet, and thus, liquid leakage may be prevented.

In addition, a cigarette according to the embodiments may provide two or more aerosol substrate sections (for example, the first substrate section and the second substrate section) containing composition materials different from each other to transport nicotine and tobacco taste and to generate a large amount of aerosol. For example, the first substrate section may only include an aerosol generating material without nicotine to generate a large amount of aerosol, and the second substrate section may include nicotine in addition to an aerosol generating material to transport tobacco taste. In this case, since the nicotine and the aerosol generating material have different boiling points or vaporization points from each other, they are required to be heated to different temperatures. For example, a first substrate section including only an aerosol generating material having a higher boiling point has to be heated to a relatively high temperature, and a second substrate section including nicotine has to be heated to a relatively low temperature to maintain persistence of nicotine generation. However, if a plurality of heaters are employed to heat the first substrate section and the second substrate section to different temperatures, power consumption may be excessively increased.

The aerosol generating system according to the embodiments may employ a single heater in the aerosol generating device, which is positioned so that a contact area between the single heater and the first substrate is different from a contact area between the single heater and the second substrate section, and thus, the first substrate section and the second substrate section may be heated to different temperatures. Accordingly, power consumption of the aerosol generating device may be minimized, while the substrate sections may be heated with different heating temperatures. As a result, aerosol and nicotine may be generated uniformly and persistently.

BEST MODE

Figure 1:
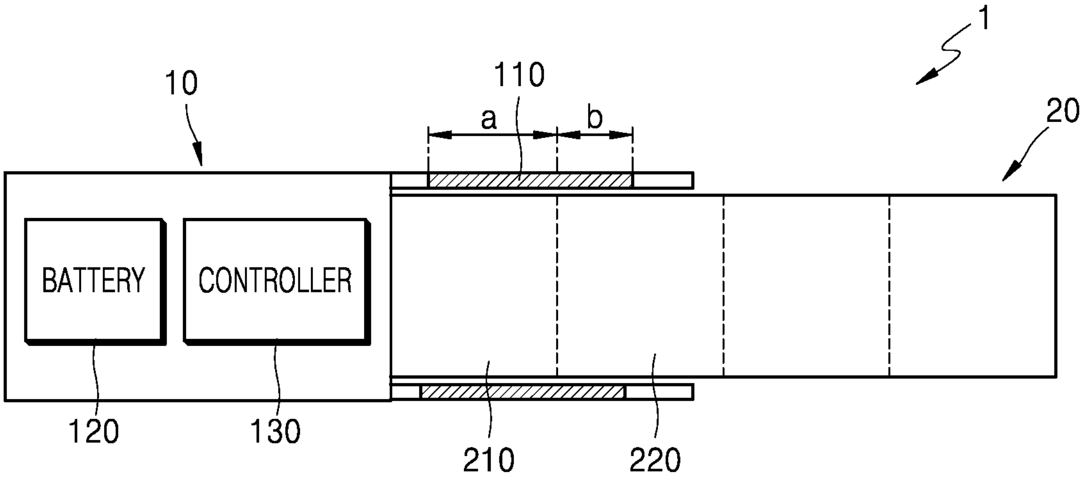
FIG. 1 is a view illustrating a configuration of an aerosol generating system according to an embodiment.

An aerosol generating system according to the present disclosure includes a cigarette including a first substrate section and a second substrate section which include a non-tobacco material sheet that has at least one surface coated with an aerosol generating material; and an aerosol generating device including an accommodation space configured to accommodate the cigarette, a heater configured to heat the cigarette accommodated in the accommodation space, a battery configured to supply power to the heater, and a controller configured to control a heating operation of the heater, wherein the heater is disposed so that a surface area of a first portion of the heater facing the first substrate section in a radial direction of the cigarette is different from a surface area of a second portion of the heater facing the second substrate section in the radial direction of the cigarette.

In one embodiment, one of the first substrate section and the second substrate section may include nicotine, and the other of the first substrate section and the second substrate section does not include nicotine.

In addition, the first substrate section and the second substrate section may include different amounts of the aerosol generating material.

The aerosol generating material may include at least one of glycerin, propylene glycol, ethylene glycol, dipropylene glycol, diethylene glycol, triethylene glycol, tetraethylene glycol and oleyl alcohol.

The cigarette may further include a thermally conductive wrapper surrounding each of the first substrate section and the second substrate section, and at least one of the first substrate section and the second substrate section may be heated by receiving heat generated by the heater through the thermally conductive wrapper.

The thermally conductive wrapper may be an oil-resistant wrapper including a metal layer.

The aerosol generating device may further include a thermally conductive tube that is coupled to an inner surface of the heater and extends in a longitudinal direction of the cigarette accommodated in the accommodation space, and at least one of the first substrate section and the second substrate section may be heated by receiving heat generated by the heater through the thermally conductive tube.

In one embodiment, the heater may be movable in a range between a first position and a second position in a longitudinal direction of the cigarette accommodated in the accommodation space such that the surface areas of the first and second portions are changed.

One end of the heater may be aligned with one end of the first substrate section at the first position, and the one end of the heater may be aligned with the other end of the first substrate section at the second position.

The aerosol generating device may further include a sensor that detects a user's puff on the cigarette, and the controller may control the heater to move from the first position to the second position when the number of detected puffs reaches a first threshold.

The controller may control the heater to return to the first position when the number of detected puffs reaches a second threshold.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Throughout the description, when a heater is in "contact" with an element, it may refer to not only a case where the heater is in direct contact with the element but also a case where there is at least one intervening element (i.e., air) that is thermally conductive between the heater and the element such that heat may be transferred from the heater to the element through the intervening element. In the case of the indirect contact, the term "contact area" may refer to a surface area of a portion of the heater facing the element of a cylindrical shape in a radial direction of the element (e.g., cigarette).

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

In addition, terms including an ordinal number such as "first" or "second" used in the present specification may be used to describe various configuration elements, but the configuration elements should not be limited by the terms. The terms are used only to distinguish one configuration element from other configuration elements.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a view illustrating a configuration of an aerosol generating system according to an embodiment.

Referring to FIG. 1, an aerosol generating system 1 may include an aerosol generating device 10 and a cigarette 20 that may be accommodated in an accommodation space of the aerosol generating device 10. The aerosol generating device 10 may include a heater 110, a battery 120, and a controller 130. The cigarette 20 may include a first substrate section 210 and a second substrate section 220. FIG. 1 only illustrates certain elements of the aerosol generating device 10 and the cigarette 20, which relate to the present embodiment. Accordingly, a person having ordinary skill in the art relating to the present embodiment may understand that other elements other than the elements illustrated in FIG. 1 may be further included in the aerosol generating device 10 and the cigarette 20.

The cigarette 20 may include the first substrate section 210 and a second substrate section 220 as an aerosol substrate section for generating aerosol. One surface or both surfaces of Each of the first substrate section 210 and the second substrate section 220 may include a sheet of a non-tobacco material, which is coated with aerosol generating material on one or both sides. The aerosol generating material may include at least one of, for example, glycerin, propylene glycol, ethylene glycol, dipropylene glycol, diethylene glycol, triethylene glycol, tetraethylene glycol, and oleyl alcohol, but is not limited thereto. The non-tobacco material may include a polymer material or a cellulose material that may absorb an aerosol generating material. For example, the sheet of non-tobacco material may be a paper sheet that does not generate odor when heated to a high temperature. However, the sheet of non-tobacco material is not limited thereto.

Furthermore, the first substrate section 210 and/or the second substrate section 220 may include nicotine for transport of tobacco taste. In the present specification, nicotine is used in a sense different from a tobacco material. In general, nicotine is also included in the tobacco material. However, in the present specification, the nicotine refers to naturally generated nicotine or synthetic nicotine, not nicotine contained in the tobacco material obtained by shaping or reconstituting tobacco leaves. For example, the nicotine may include free-nicotine or nicotine-salt.

The nicotine salt may be formed by adding suitable acid including organic or inorganic acid to the nicotine. Acid for the forming nicotine salt may be appropriately selected in consideration of an absorption rate of nicotine in the blood, a heating temperature of the single heater 110 included in the aerosol generating device 10, flavor or savor, solubility, and so on. For example, nicotine salt may be formed using benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, or malic acid, or a mixture of two or more acids selected from the above-listed acids. However, embodiments are not limited thereto.

Furthermore, each of the first substrate section 210 and the second substrate section 220 may contain other additive materials such as a flavoring agent and a wetting agent. For example, a fragrance liquid such as menthol or moisturizing agent may be sprayed to the first substrate section 210 or the second substrate section 220.

As described above, since the cigarette 20 does not include a tobacco material as a component for generating aerosol, it is possible to prevent negative tobacco tastes which are generated as the tobacco material is heated to a high temperature. In addition, an aerosol generating material is provided in a form of being absorbed or applied to a sheet of a non-tobacco material, and thus, liquid leakage may be prevented. Hereinafter, the cigarette 20 will be described in more detail with reference to FIG. 2.

Figure 2:
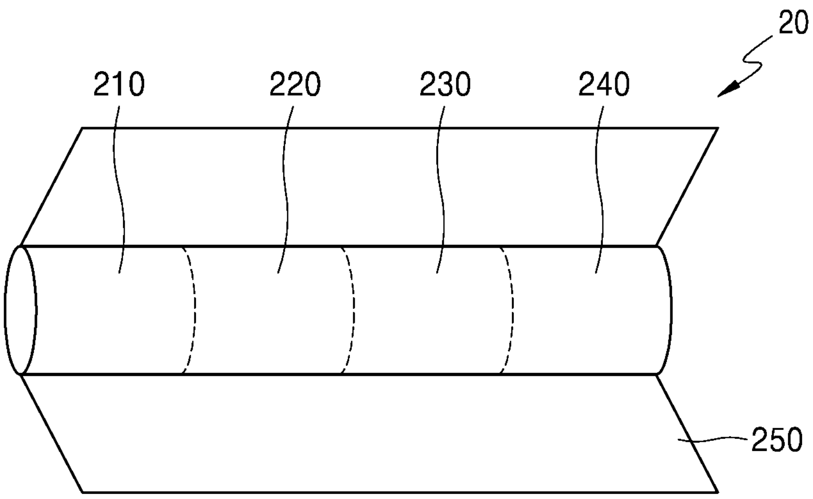
FIG. 2 is a view illustrating an example of a cigarette according to an embodiment.

FIG. 2 is a view illustrating an example of a cigarette according to an embodiment.

Referring to FIG. 2, the cigarette 20 may further include a cooling section 230, a filter section 240, and a wrapper 250 in addition to the first substrate section 210 and the second substrate section 220.

Figure 3:
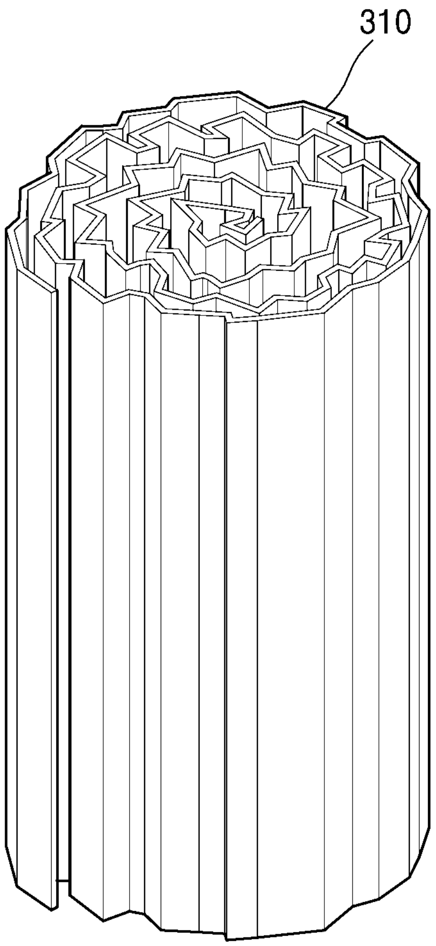
FIGS. 3 and 4 are views illustrating examples of a sheet included in an aerosol substrate section according to an embodiment.
Figure 4:
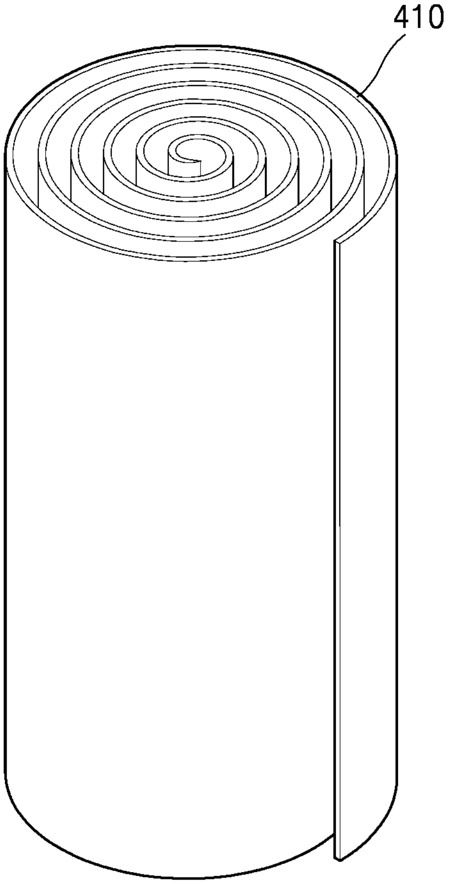

The first substrate section 210 and the second substrate section 220 may include a corrugated sheet 310 that is crimped or compressed, as illustrated in FIG. 3. Also, the first substrate section 210 and the second substrate section 220 may include a roll-type sheet 410 that is rolled without being crimped as illustrated in FIG. 4. However, the present disclosure is not limited thereto, and each of the first substrate section 210 and the second substrate section 220 may include a sheet of non-tobacco material having any other suitable shapes.

Furthermore, as the thickness of the sheet of the non-tobacco material is increased, an air gap formed by the sheet of the non-tobacco material disposed in the cigarette 20 becomes smaller, and thus, inhalation resistance of the cigarette 20 may be increased. In other words, the inhalation resistance of the cigarette 20 may be determined according to a thickness of a sheet of a non-tobacco material. Therefore, the inhalation resistance of the cigarette 20 may be adjusted by changing the thickness of the sheet of non-tobacco material. For example, a thickness of a sheet of a non-tobacco material included in each of the first substrate section 210 and the second substrate section 220 may be approximately 150 mm to 250 mm. Preferably, the thickness may be approximately 180 mm to 220 mm. However, the thickness of the sheet of the non-tobacco material is not limited thereto.

The cooling section 230 may be made of a polymer material or a biodegradable polymer material and may have a cooling function. For example, the cooling section 230 may be made of only pure polylactic acid but is not limited thereto. In addition, the cooling section 230 may be made of a cellulose acetate filter having a plurality of holes. However, the cooling section 230 is not limited to the above-described example and any other materials capable of cooling aerosol. For example, the cooling section 230 may be a tube filter or a paper tube filter including a hollow.

The filter section 240 may be a cellulose acetate filter. The shape of the filter section 240 is not limited. For example, the filter section 240 may be a cylinder type rod or a tube type rod including a hollow therein. In addition, the filter section 240 may be a recessed type load. If the filter section 240 includes a plurality of segments, at least one of the plurality of segments may be made in a different shape.

The filter section 240 may be made to generate flavor. As an example, a flavored liquid may be sprayed onto the filter section 240, or a separate fiber coated with a flavored liquid may be inserted into the filter section 240.

In addition, the filter section 240 may include at least one capsule. Here, the capsule may also function to generate flavor and/or aerosol. For example, the capsule may have a structure in which a liquid containing a fragrance is wrapped with a film. The capsule may have a spherical or cylindrical shape but is not limited thereto.

The cigarette 20 may be packaged by a wrapper 250. At least one hole through which external air flows in or internal gas flows out may be formed in the wrapper 250. In FIG. 2, the wrapper 250 is illustrated as a single wrapper, but the wrapper 250 may be a combination of a plurality of wrappers.

FIG. 2 shows that the cigarette 20 includes four segments, but it is not limited thereto. In other words, the cigarette 20 may include a smaller or larger number of segments. Also, the cigarette 20 may include at least one segment performing different functions from the cooling section 230 and the filter section 240. In addition, although FIG. 2 illustrates two aerosol substrate sections, the cigarette 20 may include more aerosol substrate sections.

Returning to FIG. 1, the cigarette 20 according to an embodiment may include two or more aerosol substrate sections (for example, the first substrate section 210 and the second substrate section 220) containing composition materials different from each other to transport nicotine and tobacco taste and to generate abundant aerosol. In one example, the first substrate section 210 includes only aerosol generating material without nicotine to generate a large amount of aerosol, and the second substrate section 220 includes not only aerosol generating materials but also nicotine to transport tobacco taste. In addition, the more aerosol generating material is included, the greater amount of aerosol is generated. Thus, the first substrate section 210 may include the aerosol generating material more than the second substrate section 220.

If the cigarette 20 includes only one aerosol substrate section including nicotine and aerosol generating material, there may be a problem because transport characteristics according to a heating temperature are different between the nicotine and aerosol generating material. For example, a boiling point of nicotine is 247° C., and a boiling point of glycerin, which is an example of an aerosol generating material, is 290° C. Thus, when the aerosol substrate section is heated to a temperature sufficient to vaporize glycerin, the nicotine may be transported too rapidly, and accordingly, the tobacco taste may not persist for long enough. In order to solve this problem, the aerosol generating system 1 according to an embodiment may separately include the first substrate section 210 including aerosol generating material without nicotine and the second substrate section 220 including nicotine, and different heating temperatures may be applied between the first substrate section 210 and the second substrate section 220.

For example, the aerosol generating system 1 may heat the first substrate section 210 including only the aerosol generating material having a higher boiling point to a relatively high temperature, and heat the second substrate section 220 including nicotine to a relatively low temperature to maintain persistent nicotine generation. To this end, a plurality of heaters may be employed to heat the first substrate section 210 and the second substrate section 220 to different temperatures. In this case, however, power consumption may be excessively increased because of the plurality of heaters.

In this regard, the aerosol generating system 1 according to an embodiment may employ a single heater 110 instead of a plurality of heaters in the aerosol generating device 10. Instead, a contact area between the single heater 110 and the first substrate 210 is different from a contact area between the single heater 110 and the second substrate section 220, such that the first substrate section 210 and the second substrate section 220 may be heated to different temperatures. In other words, due to the disposition of the single heater 110, the heating area of the first substrate 210 is different from the heating area of the second substrate 220. Accordingly, power consumption of the aerosol generating device 10 may be minimized, while the first substrate section 210 and the second substrate section 220 may be heated to different temperatures. Thereby, aerosol and nicotine may be persistently and uniformly generated.

For example, as illustrated in FIG. 1, when the length a of the single heater 110 surrounding the first substrate section 210 is longer than the length b of the single heater 110 surrounding the second substrate section 220, the contact area between the single heater 110 and the first substrate section 210 is larger than the contact area between the single heater 110 the second substrate section 220. As such, the first substrate section 210 may be heated to a higher temperature than the second substrate section 220.

As aforementioned, the term "contact" refers to not only the case where the single heater 110 is in direct contact with the first substrate section 210 or the second substrate section 220, but also refers to the case where the single heater 110 is in indirect contact with the first substrate section 210 or the second substrate section 220 through an intervening element (e.g., air) that is thermally conductive such that heat is transferred from the single heater 110 to the first substrate section 210 or the second substrate section 220. Likewise, the term "contact area" may refer to a surface area of a portion of the single heater 110 that is disposed to face the first substrate section 210 or the second substrate section 220 in a radial direction of the cigarette 20.

For example, the single heater 110 may be in indirect contact with the first substrate section 210 or the second substrate section 220 through a thermally conductive wrapper or a thermally conductive tube, and the first substrate section 210 and the second substrate section 220 may be differently heated by using the indirect heating method of using the thermally conductive wrapper or the thermally conductive tube. Hereinafter, the indirect heating method of using the thermally conductive wrapper or the thermally conductive tube will be described in more detail with reference to FIGS. 5 and 6.

Figure 5:
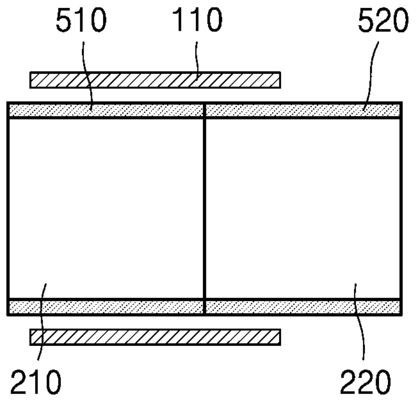
FIG. 5 is a view illustrating an example of an indirect heating method employed in an aerosol generating system according to an embodiment.

FIG. 5 is a view illustrating an example of an indirect heating method employed in the aerosol generating system according to the embodiment.

Referring to FIG. 5, the cigarette 20 may further include the thermally conductive wrappers 510 and 520 that surround the first substrate section 210 and the second substrate section 220, respectively. The thermally conductive wrappers 510 and 520 may be an oil-resistant wrapper including a metal layer to prevent the aerosol generating material in the first substrate section 210 or the second substrate section 220 from leaking to the outside and to provide sufficient thermal conductivity. For example, the thermally conductive wrappers 510 and 520 may have a form of a sheet in which a metal layer such as aluminum or copper is stacked on an oil-resistant wrapper. However, the thermally conductive wrapper is not limited thereto.

At least one of the first substrate section 210 and the second substrate section 220 may be heated by receiving heat generated by the single heater 110 through the thermally conductive wrapper 510 or 520. In the example illustrated in FIG. 5, an area between the single heater 110 and the first substrate section 210, which are in indirect contact with each other, is larger than an area between single heater 110 and the second substrate section 220, which are in indirect contact with each other. Thus, a heating temperature of the first substrate section 210 may be higher than a heating temperature of the second substrate section 220. As such, although there is only one heater (i.e., the single heater 110), the aerosol generating system 1 according to an embodiment may heat the first substrate section 210 and the second substrate section 220 differently by using an indirect heating method with the thermally conductive wrappers 510 and 520.

FIG. 5 illustrates that the thermally conductive wrapper 510 surrounding the first substrate section 210 and the thermally conductive wrapper 520 surrounding the second substrate section 220 are separately provided, but embodiments are not limited thereto. For example, a single thermally conductive wrapper may be used to wrap the first substrate section 210 and the second substrate section 220. Alternatively, a plurality of thermally conductive wrappers may be used to surround the first substrate section 210 or the second substrate section 220.

Figure 6:
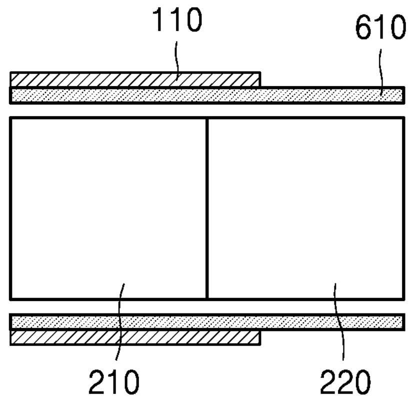
FIG. 6 is a view illustrating another example of the indirect heating method employed in an aerosol generating system according to an embodiment.

FIG. 6 is a view illustrating another example of the aerosol generating system according to an embodiment.

Referring to FIG. 6, the aerosol generating device 10 may further include a thermally conductive tube 610 that is coupled to an inner surface of the single heater 110 and extends along a longitudinal direction of the cigarette 20 accommodated in an accommodation space. The thermally conductive tube 610 may include a material with high thermal conductivity, such as stainless steel or SUS, to provide sufficient thermal conductivity.

At least one of the first substrate section 210 and the second substrate section 220 may be heated by receiving heat generated by the single heater 110 through a heat conductive tube 610. As illustrated in FIG. 6, an area between the single heater 110 and the first substrate section 210, which are in indirect contact with each other, is larger than an area between the single heater 110 and the second substrate section 220, which are in indirect contact with each other. Thus, a heating temperature of the first substrate section 210 may be higher than a heating temperature of the second substrate section 220. As such, although there is only one heater (i.e., the single heater 110), the aerosol generating system 1 according to an embodiment may heat the first substrate section 210 and the second substrate section 220 differently by using an indirect heating method with the thermally conductive tube 610. If the aerosol generating device 10 includes the thermally conductive tube 610 as illustrated in FIG. 6, the cigarette 20 may not include the thermally conductive wrapper 510 or 520 as illustrated in FIG. 5, but embodiments are not limited thereto.

Returning to FIG. 1 again, the aerosol generating device 10 may include an accommodation space for accommodating the cigarette 20. When the cigarette 20 is inserted into the aerosol generating device 10, the aerosol generating device 10 may operate the single heater 110 to generate aerosol from the cigarette 20. The aerosol generated by the single heater 110 may be delivered to a user through the cigarette 20. If necessary, even when the cigarette 20 is not inserted into the aerosol generating device 10, the aerosol generating device 10 may heat the single heater 110.

The battery 120 supplies power used to operate the aerosol generating device 10. For example, the battery 120 may supply power to heat the single heater 110 and may supply power required for the controller 130. In addition, the battery 120 may supply power required for a display, a sensor, a motor, and so on installed in the aerosol generating device 10 to operate.

The controller 130 may control overall operations of the aerosol generating device 10. Specifically, the controller 130 controls operations of other configuration elements included in the aerosol generating device 10 as well as the battery 120 and the single heater 110. In addition, the controller 130 may check states of the respective configuration elements of the aerosol generating device 10 to determine whether or not the aerosol generating device 10 is in an operable state.

The controller 130 includes at least one processor. The processor may also be implemented as an array of multiple logic gates or may also be implemented as a combination of a general-purpose microprocessor and a memory in which a program executable in the microprocessor is stored. In addition, those skilled in the art to which the present embodiment belongs may understand that the processor may be implemented as another type of hardware.

The single heater 110 may be heated by electric power supplied from the battery 120. For example, when the cigarette 20 is inserted into the aerosol generating device 10, the single heater 110 may be located outside the cigarette 20. Thus, the heated single heater 110 may increase a temperature of an aerosol generating material in the cigarette 20.

The single heater 110 may include an electric resistive heater. For example, the single heater 110 may include an electrically conductive track, and as a current flows through the electrically conductive track, the single heater 110 may be heated. However, the single heater 110 is not limited to the above-described example and may employ anything without limitation as long as heat may be increased to a desirable temperature. Here, the desirable temperature may be previously set in the aerosol generating device 10 or may be set to a desired temperature by a user.

Furthermore, as another example, the single heater 110 may be an induction heater. Specifically, the aerosol generating device 10 may include an electrically conductive coil for generating a variable magnetic field, and the single heater 110 may include a susceptor that may be heated by the variable magnetic field.

The single heater 110 may include a tubular heating element, a plate heating element, a needle heating element or a rod heating element and may heat the inside or outside of the cigarette 20 according to a shape of the heating element.

Furthermore, according to embodiments, the single heater 110 may move within the aerosol generating device 10. In an early stage of smoking, it is important to sufficiently heat the first substrate section 210 that only includes an aerosol generating material to generate a large amount of aerosol. However, as smoking progresses, it may be preferable for a heating temperature of the second substrate section 220 to be higher than the early stage of smoking to achieve persistent nicotine migration. If the single heater 110 is configured to be movable from an initial position to another position that provides a larger contact area between the single heater and the second substrate section 220 than the initial position, persistence and uniformity of aerosol generation and tobacco taste may be maintained throughout the smoking process.

The single heater 110 may be manually moved by a user's operation. In this case, the user may adjust aerosol amount and tobacco taste by moving the single heater 110. As such, user's smoking satisfaction may be increased. However, the present disclosure is not limited thereto, and the single heater 110 may be automatically moved by a control of the controller 130.

In one example, the aerosol generating device 10 may further include a sensor (not illustrated) that detects a user's puff on the cigarette 20, and when the number of detected puffs reaches a first threshold, the controller 130 may control the single heater 110 to move from a first position to a second position. In addition, when the number of detected puffs reaches a second threshold, the controller 130 may control the single heater 110 to return to the first position. The first threshold may correspond to the number of puffs indicating that the half of smoking exceeds, and the second threshold may correspond to the number of puffs indicating that the smoking reached an end point. The first threshold and the second threshold may be set by a user or may be determined by the controller 130.

As such, when the single heater 110 moves under a control of the controller 130, persistence and uniformity of aerosol generation and tobacco taste may be maintained throughout the smoking process even without a user's operation. Hereinafter, an example of an embodiment in which the single heater 110 is movable will be described with reference to FIG. 7.

Figure 7:
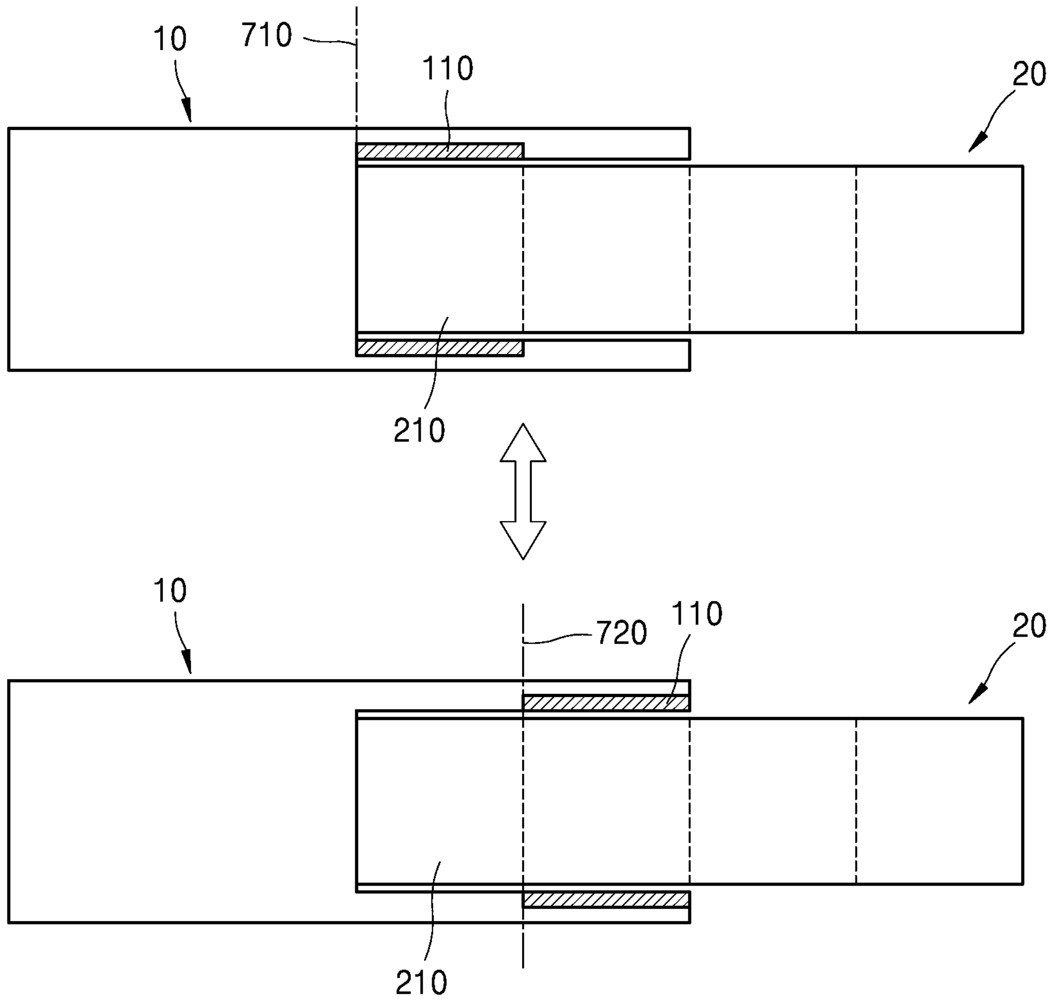
FIG. 7 is a view illustrating characteristics of a single heater according to an embodiment.

FIG. 7 is a view illustrating characteristics of the single heater according to the embodiment.

As illustrated in FIG. 7, the single heater 110 may be movable from a first position 710 to a second position 720 in a longitudinal direction of the cigarette 20 accommodated in an accommodation space. The first position 710 may be a position where one end of the single heater 110 is aligned with one end of the first substrate section 210, and the second position 720 may be a position where one end of the single heater 110 is aligned with the other end of the first substrate section 210. Here, the position of the single heater 110 may be described based on one end of the single heater 110.

When the single heater 110 is located at the first position 710 in the early stage of smoking, the single heater 110 may have a larger contact area with the first substrate section 210 than with the second substrate section 220. Thereby, a heating temperature of the first substrate section 210 may be higher than a heating temperature of the second substrate section 220, and thus, a large amount of aerosol may be generated.

Thereafter, as the smoking progresses, the single heater 110 may move toward the second position 720 such that an area between the single heater 110 and the second substrate section 220 may increase. Accordingly, the heating temperature of the second substrate section 220 may be increased, and persistence of nicotine migration may be maintained. Accordingly, persistence and uniformity of aerosol generation and tobacco taste may be maintained throughout the smoking process.

Furthermore, the first position 710 and the second position 720 illustrated in FIG. 7 are merely an example provided for the sake of convenient description, and embodiments are not limited thereto. It will be apparently understood by those skilled in the art that the single heater 110 may be configured to be movable in any suitable range.

In some of the previous examples, the first substrate section 210 does not include nicotine, whereas the second substrate section 220 includes nicotine. Also, the first substrate section 210 is described as including a larger amount of aerosol generating material than the second substrate section 220.

However, embodiments are not limited thereto. For example, the first substrate section 210 may include nicotine, the second substrate section 220 may not include nicotine. Also, the second substrate section 220 may include a larger amount of aerosol generating material than the first substrate section 210. In this case, unlike the previous examples, it will be easily understood by those skilled in the art that a contact area between the single heater 110 and the second substrate section 220 is preferably larger than a contact area between the single heater 110 and the first substrate section 210.

At least one of the components, elements, modules or units (collectively "components" in this paragraph) represented by a block in the drawings such as the controller 130 in FIG. 1 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating system comprising:

a cigarette including a first substrate section comprising aerosol generating material without nicotine and a second substrate section comprising aerosol generating material including nicotine, each of the first substrate section and the second substrate section including a non-tobacco material sheet that has at least one surface coated with an aerosol generating material; and an aerosol generating device including an accommodation space configured to accommodate the cigarette, a heater at least partially surrounding the first substrate section and at least partially surrounding the second substrate section, the heater configured to heat the cigarette accommodated in the accommodation space, a battery configured to supply power to the heater, and a controller configured to control a heating operation of the heater, wherein the heater is provided as a single heating element, and wherein the heater is configured to move from a first position where an amount of surface area of the heater facing the first substrate section in a radial direction of the cigarette is greater than an amount of surface area of the heater facing the second substrate section in the radial direction of the cigarette, such that the first substrate section is heated to a first heating temperature and the second substrate section is heated to a second heating temperature that is less than the first heating temperature, to a second position where an amount of surface area of the heater facing the first substrate section in the radial direction of the cigarette is less than an amount of surface area of the heater facing the second substrate section in the radial direction of the cigarette, such that the first substrate section is heated to a third heating temperature and the second substrate section is heated to a fourth heating temperature that is greater than the third heating temperature.

2. The aerosol generating system of claim 1, wherein the first substrate section and the second substrate section include different amounts of the aerosol generating material.

3. The aerosol generating system of claim 1, wherein the aerosol generating material includes at least one of glycerin, propylene glycol, ethylene glycol, dipropylene glycol, diethylene glycol, triethylene glycol, tetraethylene glycol, and oleyl alcohol.

4. The aerosol generating system of claim 1, wherein the cigarette further includes a thermally conductive wrapper surrounding the first substrate section and the second substrate section, and wherein at least one of the first substrate section and the second substrate section is heated by receiving heat generated by the heater through the thermally conductive wrapper.

5. The aerosol generating system of claim 4, wherein the thermally conductive wrapper is an oil-resistant wrapper including a metal layer.

6. The aerosol generating system of claim 1, wherein the aerosol generating device further includes a thermally conductive tube that is coupled to an inner surface of the heater and extends in a longitudinal direction of the cigarette accommodated in the accommodation space, and wherein at least one of the first substrate section and the second substrate section is heated by receiving heat generated by the heater through the thermally conductive tube.

7. An aerosol generating system comprising:

a cigarette including a first substrate section and a second substrate section each of which includes a non-tobacco material sheet that has at least one surface coated with an aerosol generating material; and an aerosol generating device including an accommodation space configured to accommodate the cigarette, a heater configured to heat the cigarette accommodated in the accommodation space, a battery configured to supply power to the heater, and a controller configured to control a heating operation of the heater, wherein the heater is disposed such that a surface area of a first portion of the heater facing the first substrate section in a radial direction of the cigarette is different from a surface area of a second portion of the heater facing the second substrate section in the radial direction of the cigarette, and wherein the heater is movable in a range between a first position and a second position in a longitudinal direction of the cigarette accommodated in the accommodation space such that the surface area of the first portion and the surface area of the second portion are changed.

8. The aerosol generating system of claim 7, wherein a first end of the heater is aligned with a first end of the first substrate section at the first position, and the first end of the heater is aligned with a second end of the first substrate section at the second position.

9. The aerosol generating system of claim 7, wherein the aerosol generating device further includes a sensor that detects a user's puff on the cigarette, and wherein the controller controls the heater to move from the first position to the second position based on a number of detected puffs reaching a first threshold.

10. The aerosol generating system of claim 9, wherein the controller controls the heater to return to the first position based on the number of detected puffs reaching a second threshold.

* * * * *